United States Patent [19]
Shen et al.

[11] Patent Number: 5,790,443
[45] Date of Patent: Aug. 4, 1998

[54] MIXED-MODULO ADDRESS GENERATION USING SHADOW SEGMENT REGISTERS

[75] Inventors: Gene Shen, Mountain View; Shalesh Thusoo, Milpitas; James S. Blomgren, San Jose; Betty Kikuta, Mountain View, all of Calif.

[73] Assignee: S3 Incorporated, Santa Clara, Calif.

[21] Appl. No.: 618,632

[22] Filed: Mar. 19, 1996

Related U.S. Application Data

[63] Continuation-in-part of Ser. No. 252,579, Jun. 1, 1994, Pat. No. 5,511,017.

[51] Int. Cl.[6] .................. G06F 7/38; G06F 9/26
[52] U.S. Cl. ........................... 364/746; 711/200
[58] Field of Search ............... 364/736.01, 736.04, 364/746, 768, 784, 786, 787; 711/200, 209, 212, 213, 214, 215, 220

[56] References Cited

U.S. PATENT DOCUMENTS

| | | | |
|---|---|---|---|
| 4,598,266 | 7/1986 | Bernardson | 364/746 X |
| 4,722,067 | 1/1988 | Williams | 364/746 |
| 4,742,479 | 5/1988 | Kloker et al. | 364/746 |
| 4,935,867 | 6/1990 | Wang et al. | 364/746 X |
| 5,249,148 | 9/1993 | Catherwood et al. | 364/746 |
| 5,293,592 | 3/1994 | Fu et al. | 395/375 |
| 5,335,333 | 8/1994 | Hinton et al. | 395/400 |
| 5,381,360 | 1/1995 | Shridhar et al. | 364/746 |
| 5,408,626 | 4/1995 | Dixit | 395/400 |

*Primary Examiner*—Chuong Dinh Ngo
*Attorney, Agent, or Firm*—Stuart T. Auvinen

[57] ABSTRACT

A mixed-modulo address generation unit has several inputs. The unit effectively adds together a subset of these inputs in a reduced modulus while simultaneously adding other inputs in a full modulus to the partial sum of reduced-modulus inputs. The subset of inputs receives reduced-width address components such as 16-bit address components which are effectively added together in modulo 64K. The other inputs receive full-width address components such as 32-bit components which are added in the full modulus, 4G. Reduced-width components are zero-extended to 32 bits before input to a standard 32-bit adder. A 16-bit carry generator also receives the reduced-width components and generates the carries out of the 16th bit position. When one or more carries is detected, a correction term is subtracted from the initial sum which is recirculated to the adder's input in a subsequent step. The correction term is the number of carries out of the 16th bit position multiplied by 64K. The full-width segment bases for all active segments are stored in the register file, but the most commonly accessed segments, the data and stack segments, have a copy of their segment bases also stored in a shadow register for input to the adder. Thus the number of read ports to the register file is reduced by the shadow segment register. Less-frequently-used segments require an additional step through the adder to generate the address, but addresses in the data and stack segments are generated in a single cycle.

19 Claims, 5 Drawing Sheets

FIG. 1: Prior Art

FIG. 3
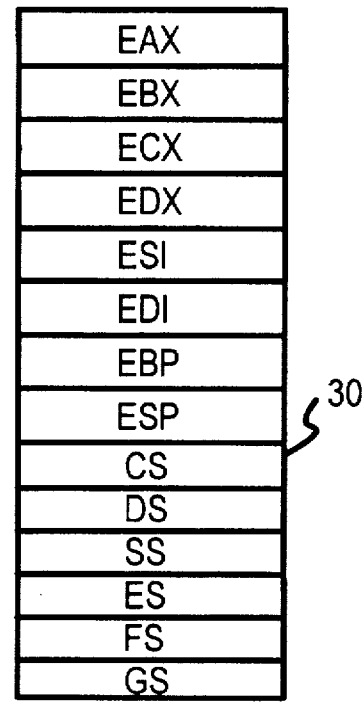
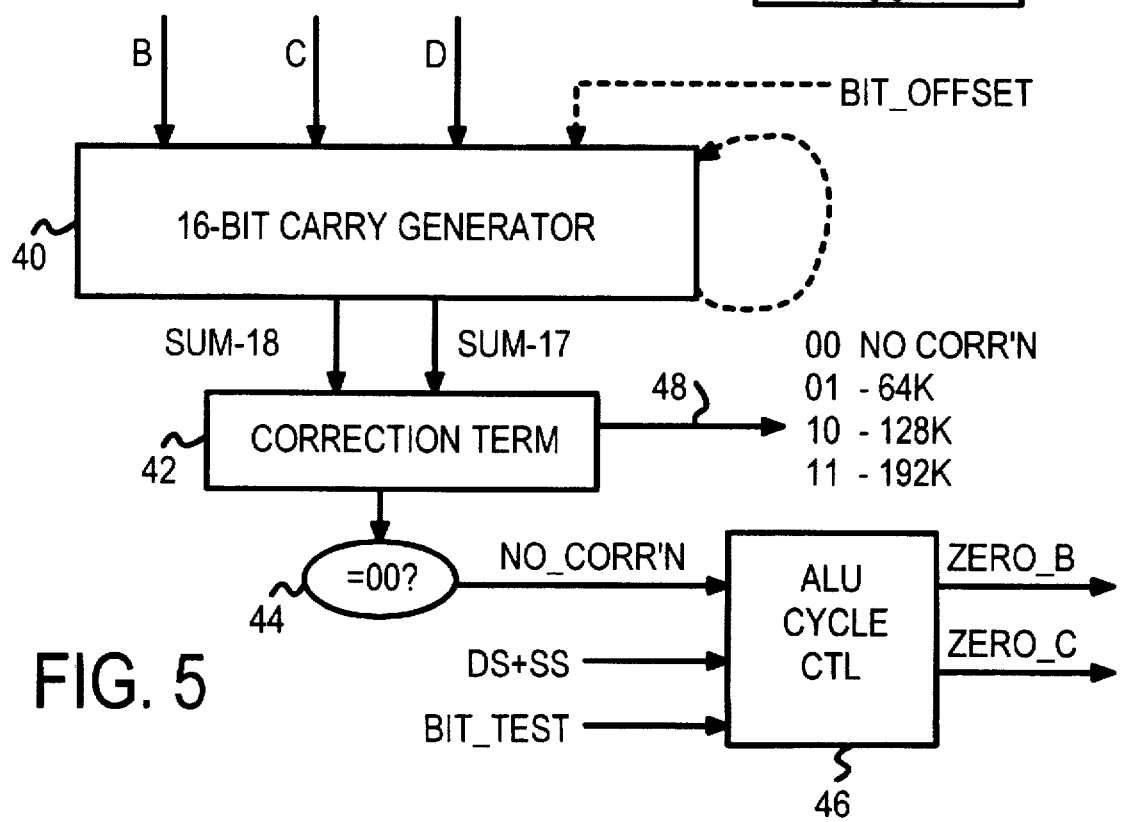
FIG. 5

5,790,443

MIXED-MODULO ADDRESS GENERATION USING SHADOW SEGMENT REGISTERS

RELATED APPLICATION

This is a Continuation-In-Part (CIP) of "Reduced-Modulus Address Generation Using Sign-Extension and Correction", U.S. Ser. No. 08/252,579, filed on Jun. 1, 1994 now U.S. Pat. No. 5,511,017, hereby incorporated by reference.

BACKGROUND OF THE INVENTION

1. Field of the Invention

This invention relates to digital computing, and more particularly to address generation in a computer's processor.

2. Description of the Related Art

Computer architectures for the commercial marketplace often must execute code written for an earlier-generation central processing unit (CPU). One popular commercial architecture is the x86 architecture embodied in CPU's manufactured by Intel Corporation of Santa Clara, Calif., and others. Earlier x86 CPU's, such as the 8086, supported address generation from 16-bit address components, while more recent members of the x86 architecture, such as the 386 and 486 CPU's, generate addresses from 32-bit components. However, older code written for the 8086 must also be executable on the newer CPU's. Thus newer CPU's must support address generation from both 16-bit and 32-bit address components. In the x86 architecture, 32 bits is the full modulus while 16 bits is the reduced modulus. Thus the x86 architecture is a mixed-modulus architecture.

FIG. 1 illustrates address generation in a prior-art x86 CPU. An adder 10 adds together a first address component, base 12, designated "X", and a second address component, index 14, designated "Y". Both address components 12 and 14 are 16-bits wide. Adder 10 is a 16-bit adder producing a 16-bit result 18. Result 18 is known in the x86 architecture as the effective address. Any carry-out 16 from the most-significant bit in adder 10 is ignored. Thus addresses above $2^{16}$ (64K) wrap around to address zero.

The 16-bit effective address result 18 is added to a 32-bit address of a segment base 22 in a 32-bit adder 20. The adder 20 outputs a 32-bit linear address 24. Thus the X and Y address components 12, 14 are added in modulo 64K, while their result 18 is added to segment base 22 in modulo 4G. Result 18 is zero-extended from 16 bits to 32 bits before being input to 32-bit adder 20. K refers to $2^{10}$ or 1024, while G refers to $2^{30}$.

The 16-bit adder 10 may be extended to 32-bits so that 32-bit address components may be added; however, the adder 10 must be capable of a 16-bit, modulo-64K add to support older code requiring 16-bit address generation.

The address generate unit of FIG. 1 suffers from having to perform two full adds in series when generating addresses. A three-port adder can be employed to reduce the address generate unit to a single stage. However, additional logic is required to ensure that 16-bit address components are added modulo 64K and not with a full 32-bit, modulo-4G addition.

Such additional logic is described in U.S. Pat. No. 5,233,553 issued to Shak, Decker and Blomgren and assigned to Chips and Technologies, Inc. of San Jose, Calif. A 3-port adder generates the linear address while a separate 2-port adder generates the effective address, which is not normally used. The 2-port adder determines if the result is greater than 64K, indicating that a modulo-64K address wrap-around has occurred. The carry-out from the 16th bit position in the 2-port adder signals that the sum of the address components is greater than 64K.

When a carry-out from bit position 16 is signaled from the 2-port adder, additional combinatorial logic acts to modify an intermediate carry in the full adder, emulating the modulo-64K address wrap. While the 3-port adder has reduced delays relative to the two adders in series of FIG. 1, a second 2-port adder is still required, adding expense and complexity. Modifying the intermediate carry within the 3-port adder is cumbersome, slowing the adder by the inclusion of the additional combinatorial logic.

What is desired is an address generate unit that can account for the modulo-64K addition of address components 12, 14 without inserting additional delay into the critical path because of combinatorial logic for carry-modification, and without requiring an additional full adder.

The parent application described a mixed-modulo adder which simultaneously adds reduced-width address components to a full-width address component in a standard 3-port adder. A correction term, equal to 64K or the 2's complement of 64K, is added to the sum in a subsequent step when necessary. A carry-generate unit determines when the correction term is needed by generating the carry from the 16-bit components.

The parent application could require that three components are read from a register file for each address generated: a base, an index, and a segment base. However, read ports to a register file are expensive and it is desired to reduce the number of read ports required and thus reduce the cost. The parent application used 32-bit sign-extension of a 16-bit signed component which could result in either a negative or a positive correction term being added. It is also desired to simplify the correction term so that only a negative correction term is ever added.

It is also desired to extend the mixed-modulo adder to perform a more complex instruction known as the bit-test instruction. The bit-test instruction reads a single bit in a register or memory and loads this bit into the flags register. A bit offset must be added to the other address components when generating the address of the single bit.

SUMMARY OF THE INVENTION

A mixed-modulo address generation unit supports address generation from both reduced-modulus 16-bit and full-modulus 32-bit address components. The unit uses a standard 3-port adder which adds all inputs together in the full modulus. However, a correction term may be added to the sum to account for some address components that must be added together in the reduced modulus. Thus a standard adder may be used and the correction term added in only when needed.

When required, the correction term is added to the uncorrected sum during an additional subsequent step. The mixed-modulo address generation unit adds together an unsigned reduced-width address component and a signed reduced-width address component in a reduced modulus, while adding a full-width address component in a full modulus. The signed reduced-width address component has a sign bit indicating if the signed reduced-width address component represents a positive or a negative number.

A mixed-modulo adder adds together reduced-width binary numbers in a reduced modulus while further adding in a full-width binary number in a full modulus. The mixed-modulo adder has a zero-extend means which receives the reduced-width binary numbers. It extends the reduced-width binary numbers to a full width and outputs extended binary numbers having the full width.

A multi-port adder receives as inputs the extended binary numbers from the zero-extend means and receives the full-width binary number. It calculates a full-modulus sum of the inputs received. A reduced-modulus carry generator means receives the reduced-width binary numbers. It generates a reduced-modulus carry-out when a sum of the reduced-width binary numbers equals or exceeds the reduced modulus.

A correction term input means is coupled to an input of the multi-port adder. It inputs in a subsequent step a correction term to the multi-port adder when the reduced-modulus carry-out is generated. The correction term is an adjustment to the full-modulus sum to compensate for the effect of addition of the reduced-width binary numbers in the full-modulus.

Thus full-modulus addition is performed on the reduced-width binary numbers by zero-extension and addition of the correction term in the subsequent step when the reduced-modulus carry-out is generated by the reduced-modulus carry generator means.

In further aspects of the invention the carry-out which is generated by the reduced-modulus carry generator means indicates a number of carries out of the reduced modulus. A correction term generation means is coupled to the correction term input means and receives the carry-out. It generates the correction term as the reduced modulus multiplied by the number of carries out of the reduced modulus. Thus the correction term is adjusted for multiple carries out of the reduced modulus detected by the reduced-modulus carry generator means.

In still further aspects a complement means receives the correction term and is coupled to the correction term input means. It generates a two's complement of the correction term for input to the multi-port adder.

In other aspects the reduced-width binary numbers are address components and the full-width binary number is a segment base address. The full-modulus sum is a linear address when the carry-out is not generated, but a sum from the multi-port adder in the subsequent step is the linear address when the carry-out is generated. The full width is 32 bits and the reduced width is 16 bits and the reduced modulus is 64K.

In other aspects the invention has a register file which is coupled to the zero-extend means. The register file stores the reduced-width binary numbers and a plurality of segment bases includes the full-width binary number. A shadow segment register is coupled to the multi-port adder. The shadow segment register stores a copy of a segment base for a frequently-accessed segment.

Segment base input means is coupled to the shadow segment register. It inputs as the full-width binary number to the multi-port adder the segment base in the shadow segment register when the linear address is an address in the frequently-accessed segment. When the linear address is not an address in the frequently-accessed segment, then the full-width binary number input to the multi-port adder is a segment base in the register file.

In further aspects, when the linear address is not an address in the frequently-accessed segment, the segment base in the register file is input to the multi-port adder during an additional step. Thus the additional step is required when the linear address is not an address in the frequently-accessed segment.

In further aspects of the invention the frequently-accessed segment is a data segment or a stack segment in an x86 architecture.

BRIEF DESCRIPTION OF THE DRAWINGS

FIG. 3 shows that the register file contains many general-purpose registers (GPR's) and segment registers which may be accessed as base, index, or segment base components.

FIG. 5 is a reduced-modulus carry generator for generating a correction term for the mixed-modulo adder.

DETAILED DESCRIPTION

Figure 1:
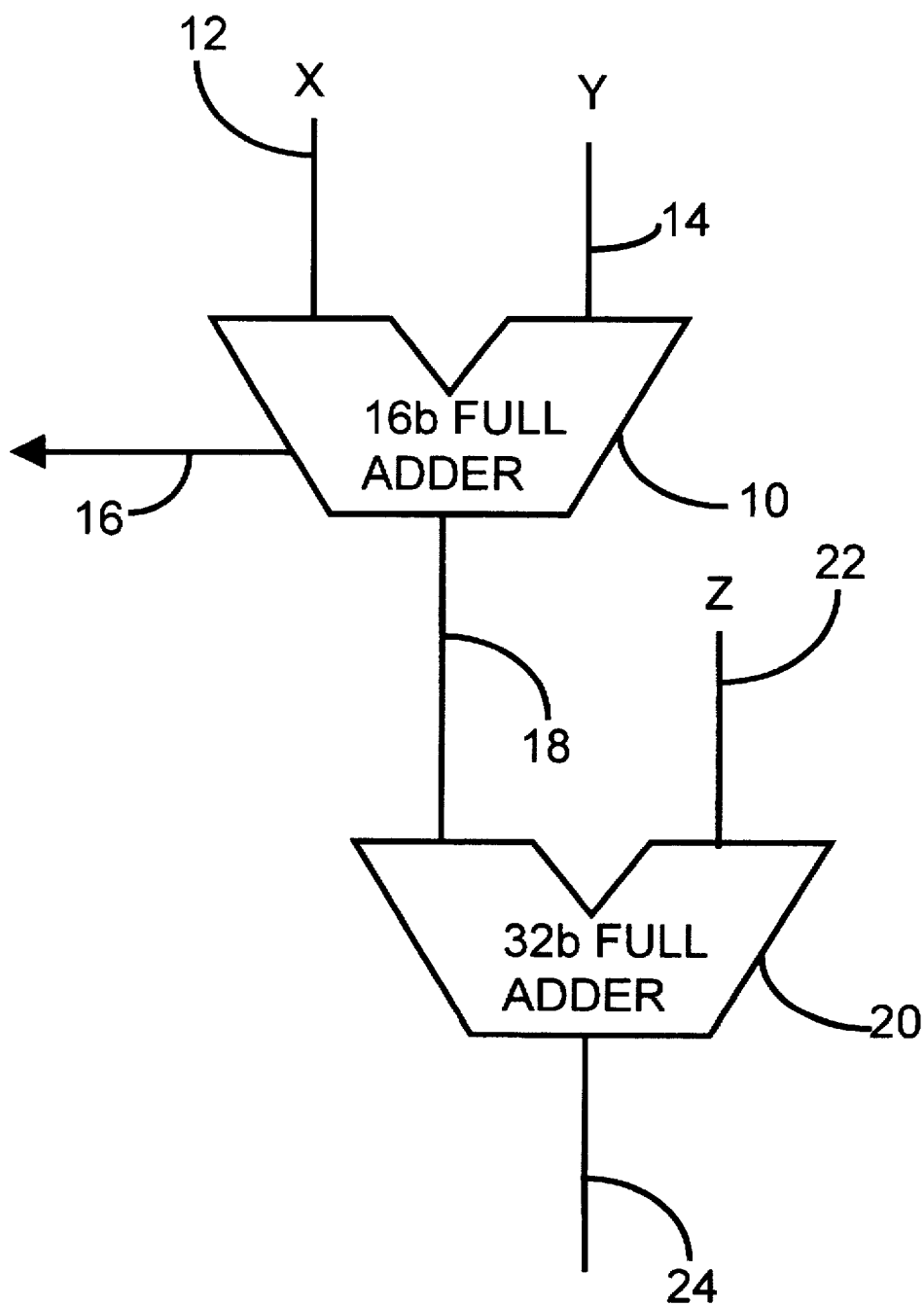
FIG. 1 is a prior-art x86 address generate unit having a 16-bit adder and a separate 32-bit adder.

The present invention relates to an improvement in address generation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

OVERVIEW OF A MIXED-MODULO ADDER

Computers compatible the x86 architecture must execute older 16-bit code and newer 32-bit code. Address generation may require that several address components be added together. However, 16-bit components must be added together in a 16-bit modulus, in which the range of numbers representable is $2^{16}$ or 64K. An address wrap-around occurs when two numbers are added together and their sum is equal to or exceeds the modulus. Thus if the modulus is 64K, then 60K+5K wraps around to address 1K rather than to address 65K, because 65K is outside of the address range of the modulus.

Negative signed numbers are represented in two's complement format, where the largest numbers are used to represent negative values. For example, the number −5 may be represented in two's complement by the number 64K−5. When −5 is added to 6, although the decimal result, 1, does not exceed the modulus, the result of adding the two's complement, 64K−5, to 6 does exceed the modulus, because the result is 64K−5+6, or 64K+1. Thus the sum of an unsigned component and a signed component represented in two's complement may be equal to or exceed the reduced modulus when both components are treated as positive numbers.

Address components having a reduced width, such as 16 bits, should be added together in a 16-bit adder, which causes the address components to be added in modulo 64K. However, the x86 architecture requires that the 16-bit result then be zero-extended and added to a 32-bit segment base address in the full modulus, $2^{32}$, or modulo 4G, which occurs in a 32-bit adder.

The present invention simultaneously adds all types of address components, both 32-bit and 16-bit, in a single 32-bit adder. The 32-bit adder can be a standard 3-port adder without any modification for reduced-modulus address generation. If an unexpected address wrap-around should occur in the partial sum of the 16-bit address components, then the 32-bit sum from the 32-bit adder is an incorrect sum and must be corrected. A correction term is added to the 32-bit incorrect sum in a subsequent step in the same 32-bit adder by recirculating the incorrect sum back to one of the inputs to the adder, and then adding the correction term to get the proper sum that accounts for the 16-bit address wrap-around.

In prior-art systems a full 2-port adder was used to determine if an address wrap-around occurred. The sum of the 16-bit address components was also calculated by the 2-port adder. In the present invention a high-speed look-ahead carry generator and propagator is used to quickly determine if a carry-out occurs when adding the 16-bit address components. A reduced-modulus carry-out signal for the 16-bit add is thus rapidly generated. The sum of the 16-bit address components is not needed and not generated, making the carry-generate logic simpler and faster.

Correction Term Positive or Negative in Parent Application

In the parent application, the reduced-modulus carry-out for the 16-bit add did not in itself determine if a correction is needed. A sign-extension was performed on one of the 16-bit inputs to the 32-bit adder. The sign-extension of a positive 16-bit address component has no effect on the sum. Thus positive numbers require the correction term only when the reduced-modulus carry-out is signaled.

However, sign-extension of a negative 16-bit number to 32 bits "adds" in 16 binary one's, from bit-position 17 to bit-position 32. These 16 binary one's are equivalent to the number −64K. Thus an additional term of −64K was added in by the sign-extension operation when a negative 16-bit number was sign-extended to 32 bits. If a reduced-modulus carry-out is signaled, the negative sign-extension operation itself supplies the proper correction term, and no further correction is needed. Negative numbers required an explicit correction term only when the reduced-modulus carry-out was not signaled.

16-Bit Components Zero Extended Rather than Sign-Extended

Having a correction term of either positive 64K or negative 64K becomes more complex when a greater number of components are added. The present invention reduced this complexity by not sign-extending negative 16-bit components. Instead, these 16-bit components are zero-extended to 32 bits. Thus the sign-extension operation no longer automatically adds the correction term. A single correction term is now used for both positive and negative 16-bit components.

Thus the invention zero-extends the 16-bit address components and calculates the 32-bit sum, and then applies a correction term if needed in a subsequent step. There is no performance penalty except for the rare times that a 16-bit correction is necessary. Note that the correction term is needed only when the 16-bit address components have generated an arithmetic overflow, when their sum cannot be accurately represented in 16 bits. In practice, overflow of the 16-bit address components is indeed rare, usually the result of a programming error such as an array overrun or obscure programming practices. Only adding a correction term under these rare conditions is an advantage over the prior art, which adds additional logic into the critical speed path of the adder to account for the address wrap-around, slowing down address computations.

SIMPLE X86 4-PORT ADDRESS GENERATOR—FIG. 2

Figure 2:
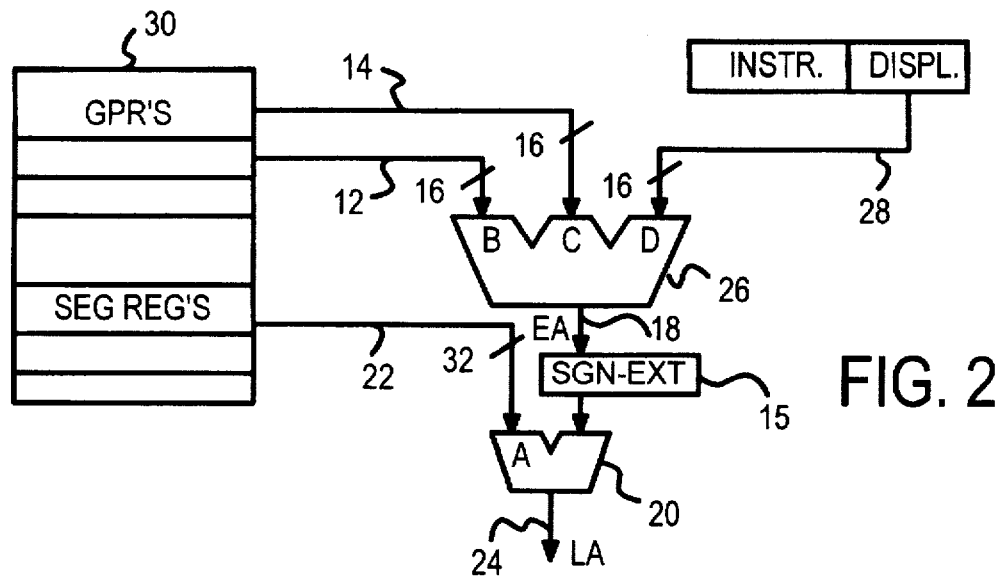
FIG. 2 illustrates a simple address generator for complex x86 instructions using two adders having a total of four ports for four address components.

FIG. 2 illustrates a simple address generator for complex x86 instructions using four ports for four address components. Register file 30 supplies two 16-bit address components, base 12 and index 14, to ports B, C of 3-port adder 26. A displacement 28 is contained in an instruction word and is extracted from the instruction word by an instruction decode unit (not shown) and supplied to port D of 3-port adder 26.

Three-port adder 26 performs a 16-bit modulo 64K add when 16-bit components are used, truncating the result to 16 bits. The result 18 is the program address or effective address (EA). Result 18 from three-port adder 26 is sign-extended by extender 15 to generate a valid 32-bit address which is input to adder 20.

One of the segment registers in register file 30 is also read and segment base 22 is supplied to port A of 2-port adder 20, which adds segment base 22 to result 18 after sign-extension by extender 15 to generate linear address 24. Linear address 24 may next be translated using a translation-lookaside buffer (TLB) in a paging translation scheme to generate a physical address.

Two Separate Adders Used in Standard Single-Modulo Adder

Two separate adders are used because the 16-bit address components must be added in modulo 64K, while the 32-bit segment base is added in modulo 4G. Thus 3-port adder 26 adds components in modulo 64K, while 2-port adder 20 adds in the full modulus, 4G. These two adders can be combined into a single adder when the invention's mixed-modulo adder is used, as later shown in FIGS. 4, 5, 6.

Three Read Ports Necessary

FIG. 2 highlights that three registers are read in register file 30 for each linear address 24 generated. Base 12, index 14, and segment base 22 must each be read from register file 30. If a new linear address 24 is to be generated each clock cycle, then these three reads must be performed simultaneously in a single clock cycle. Since address generation is often a speed-critical path on a microprocessor, these read ports must be high-speed ports. Thus register file 30 must have at least three read ports.

Multiple Read Ports Expensive

Unfortunately, such multiple read ports are expensive to implement. Register file 30 is typically a RAM array of identical RAM memory cells. FIG. 3 shows that register file 30 contains many general-purpose registers (GPR's), any of which may be accessed as either base 12 or index 14, depending upon the program being executed. Likewise, register file 30 contains many segment registers, any of which may be selected to supply segment base 22. For the x86 architecture, four 32-bit GPR's are provided, labeled EAX, EBX, ECX, EDX, and other general addressing registers ESI, EDI, EBP, ESP which are also used as a GPR for address generation. Many segment registers are also provided. For instruction fetches, the code segment register CS is normally used, while data operands often access the data segment DS. A data structure known as the stack is also frequently used; its segment is the stack segment SS. Extra segment registers for general use are the ES, FS, and GS segment registers. Other registers for system use are often also present in register file 30. These registers are sometimes referred to as segment base registers since they provide a base address for adding to the effective address.

The multiple read ports usually require additional access transistors within each RAM memory cell of each register. These additional transistors increase the size of each cell and thus increase both the cost and power requirements for register file 30. While two of the read ports could be localized to the GPR's while the third read port localized to the segment registers, this would require an irregular array which is not desirable. Nor is it desirable to break register file 30 into two or more separate arrays, as this also increases cost and power and complicates writing and testing the registers.

SHADOW SEGMENT REGISTERS REDUCE READ PORTS

Figure 4:
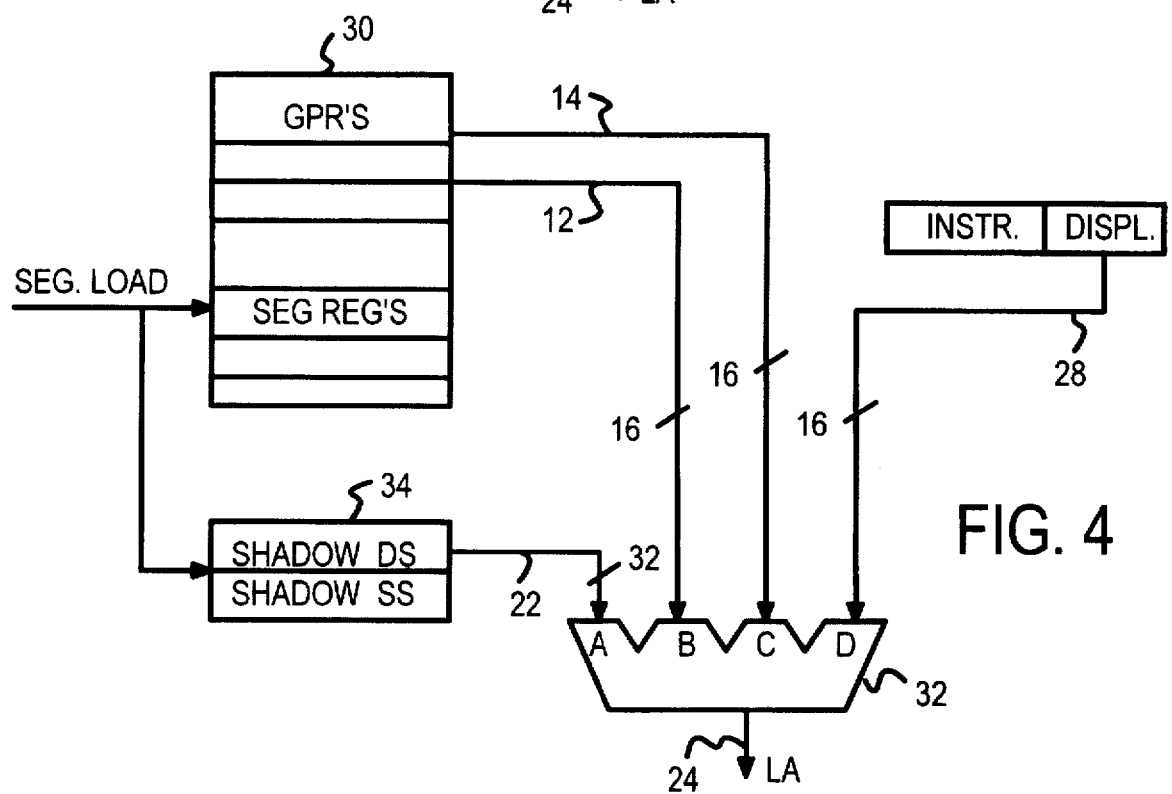
FIG. 4 shows a four-port adder using shadow segment registers and using just two read ports of the register file.

FIG. 4 shows a four-port adder using shadow segment registers and using just two read ports of register file 30. Four-port adder 32 is a mixed-modulo adder, adding a 32-bit segment base 22 to 16-bit address components including base 12 and index 14 from register file 30, and displacement 28 from the decode of the instruction word. The effective address is not normally generated. Instead, the linear address is directly generated as result linear address 24.

Using a four-port adder reduces the logic delay for generating the linear address and potentially allows a shorter clock cycle to be used. However, since some of the inputs are in the 16-bit reduced modulus while other components are in the 32-bit full modulus, a correction term is occasionally needed to perform the mixed-modulo address generation.

Shadow segment registers 34 supply segment base 22 for most addresses. While register file 30 contains the primary copy of segment base 22, a shadow, read-only copy of segment base 34 is loaded into shadow segment registers 34. Shadow segment registers 34 are single-port registers which are read during address generation. Other operations using segment registers read the primary copy in register file 30. For example, a move of the segment base from one segment register to another register is performed by reading the primary copy in register file 30. A load of a new segment base value into a segment register causes the primary copy to be written. Using the primary copy in register file 30 simplifies register operations since all registers are located in the same RAM array.

Shadow segment registers 34 are located near the address generate stage of the processor's pipeline, while register file 30 is often located adjacent to but separate from the pipeline. Register file 30 must be accessed by several different stages of the pipeline and thus cannot reside in a single pipeline stage, as can shadow segment register 34. Register file 30 is typically read in the decode stage at the beginning of the pipeline for register operands and address components, but written by results at the end of the pipeline in the write-back stage.

Shadow segment registers 34 do not contain copies of all of the segment registers in register file 30. Only the most frequently used segments are kept in shadow segment registers 34. Since address generation is mostly performed for operands in the data or stack segments, shadow segment registers 34 contain copies of the segment base for just the data segment (DS) and stack segment (SS). When another segment is used, then multi-cycle address generation occurs using the two read ports of register file 30 several times until all of the components are read.

The code segment is also frequently accessed. However, the code segment is mostly accessed for instruction fetching, which uses dedicated fetch hardware rather than the address generate unit shown in FIG. 4. On occasions when the code segment is accessed to generate an operand address, typically not all of the address components are used, but a more simple addressing mode is used. Thus fewer address components need be read and fewer ports are required.

When a new segment is loaded into a segment register in register file 30, the new segment base is also copied into shadow segment registers 34 when the segment loaded is either the data segment (DS) or the stack segment (SS). A simple compare of the register being written in register file 30 can be used to determine when to write a copy to shadow segment registers 34. Thus a current copy of the segment base address for the data and stack segments is kept in shadow segment registers 34.

Thus using shadow segment registers 34 reduces the number of required read ports on register file 30. Only base 12 and index 14 are read from register file 30 for most addresses generated. When the segment is not the data or stack segment, then additional cycles are used to fetch the segment base from register file 30 using the two available read ports.

ADDRESS WRAP DETECTED BY CARRY GENERATOR—FIG. 5

FIG. 5 is a reduced-modulus carry generator for generating a correction term for the mixed-modulo adder. Reduced-modulus carry generator 40 receives on inputs B, C, D all reduced-width address components being added in a current cycle in four-port adder 32 of FIG. 4. The base 12 and index 14 being input to ports B, C of four-port adder 32 are also input to ports B, C of carry generator 40. Likewise port D receives the displacement from the instruction decode.

In prior-art systems a full 2-port adder was used to determine if an address wrap-around occurred. The sum of the 16-bit address components was also calculated by the 2-port adder. In the present invention a high-speed look-ahead carry generator and propagator is used to quickly determine if a carry-out occurs when adding the 16-bit address components. A reduced-modulus carry-out signal, indicating that the address wrap has occurred, for the 16-bit add is thus rapidly generated. The carry out from the 16 bits indicates that the 16-bit address wrap has occurred. The sum of the 16-bit address components is not needed and not generated, making the carry-generate logic simpler and faster.

When full-width address components are being added, carry generator 40 is disabled from generating a correction term. Normally the base, index, and displacement are either all 16-bit components or all 32-bit components.

A more complex instruction, known as the bit test instruction, adds another component, the bit_offset address component, which is also received by carry generator 40. The bit_offset is often a reduced-width component. For bit test instructions, multiple cycles through four-port adder 32 are necessary, so the output from carry generator 40 is recirculated back to its input for subsequent cycles.

Since as many as four reduced-width address components may be added together in the reduced modulus, up to three carries out of the 16th bit-position may be generated. For example, three carries are generated when adding the 16-bit address components:

|   |              |          |
|---|--------------|----------|
|   | base         | C000 hex |
|   | index        | C003 hex |
|   | displacement | C002 hex |
| + | bit_offset   | C001 hex |
|   |              | 30006 hex |

The three carries have a binary value of 3, which requires two binary bit-positions (11). Thus carry generator 40 outputs two bits, shown as sum-17 and sum-18, for the 17th and 18th bit positions. The first 16 bits of the sum need not be generated by carry generator 40 since these bits are not needed. Sum bit 17 is the carry out of the 16th bit position when only one carry is generated. Sum bit 18 is the carry from bit-position 17, which is a one when two or three carries from the 16-bit sum are generated.

Correction term generator 42 receives the 17th and 18th sum bits from carry generator 40 and latches and outputs these sum bits as correction term 48. When the sum of the 16-bit address components produces no carries, correction term 48 is 00, indicating that no correction term is necessary. When one carry is generated from the sum of the 16-bit address components, correction term 48 is 01, indicating that 64K should be subtracted from the uncorrected sum from four-port adder 32 of FIG. 4. When two carries are generated from the sum of the 16-bit address components, correction term 48 is 10, indicating that 2×64K or 128K should be subtracted from the uncorrected sum from four-port adder 32. Finally when three carries are generated from the sum of the 16-bit address components, correction term 48 is 11, indicating that 3×64K or 192K should be subtracted from the uncorrected sum from four-port adder 32.

Comparator 44 signals to ALU cycle controller 46 when correction term 48 has the value 00, indicating that no correction step is necessary. The subsequent step for subtracting the correction term from the uncorrected sum in the first step is generated when comparator 44 determines that the value of correction term 48 is not 00. ALU cycle controller 46 also receives an indication when the segment accessed is the data or stack segments (DS+SS), which is used when accessing a segment other than DS or SS to generate another subsequent step to add in the segment base using one of the two ports to register file 30. ALU cycle controller 46 also receives a BIT_TEST signal from the instruction decoder indicating when the instruction is a bit test instruction. A special sequence of multiple steps is requires when a bit test instruction generates a memory address as is described later.

ALU cycle controller 46 also generates signals to zero the inputs to the A, B and C ports of four-port adder 32 and carry generator 40 during subsequent steps and when no address component is being input through either port A, B or C. Many other controls are generated by ALU cycle controller 46 to control the sequencing and operation of the pipeline including the arithmetic-logic-unit or address generate unit.

The mixed-modulo adder includes four-port adder of FIG. 4 and the carry generator 40 and correction term generator 42 of FIG. 5. Carry generator 40 may be implemented in high-speed ECL or BiCMOS, and many implementations are possible within the spirit of the invention.

DETAIL OF MIXED-MODULO ADDER—FIG. 6

Figure 6:
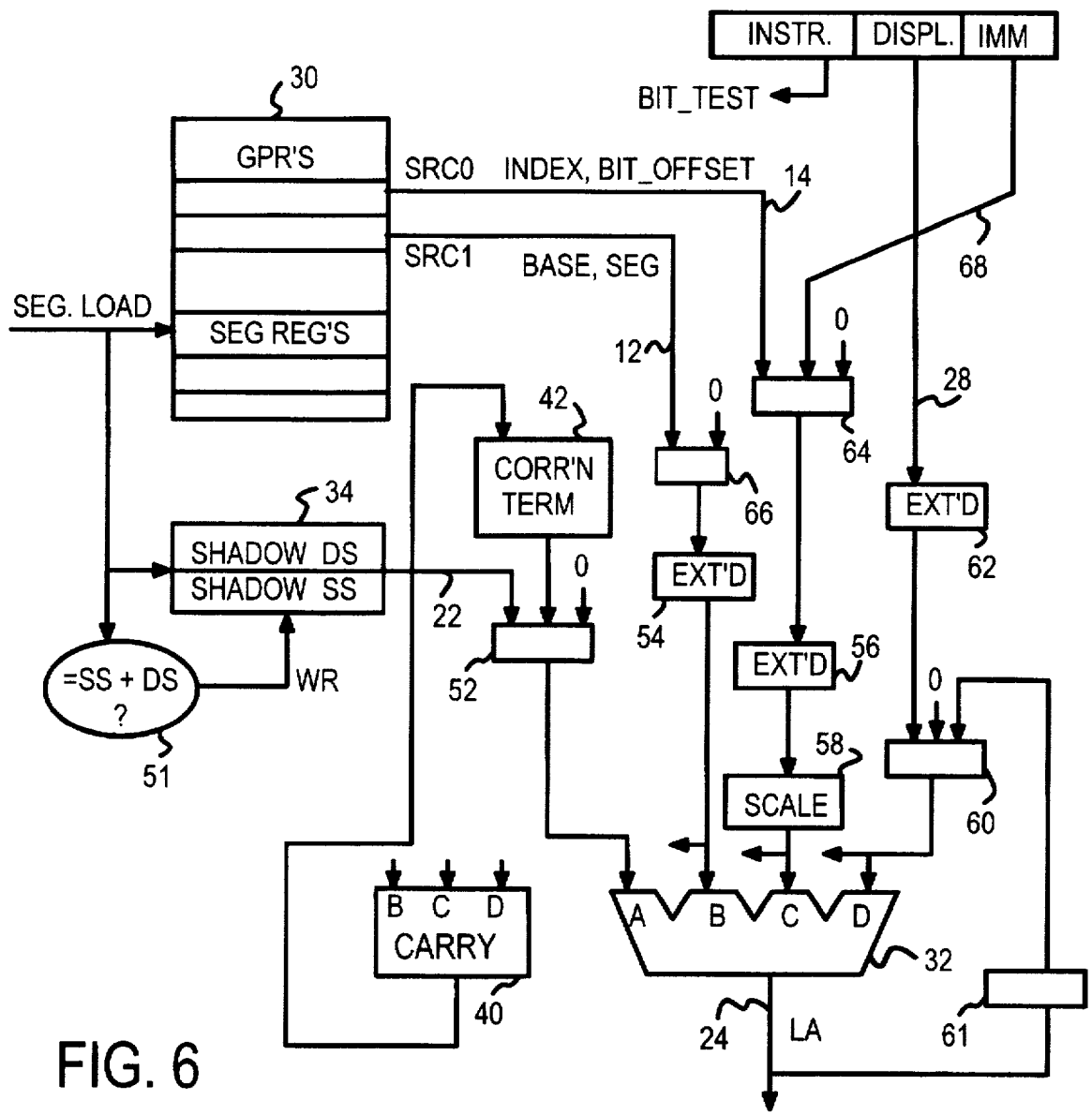
FIG. 6 is a detailed diagram of a mixed-modulo adder using shadow segment registers to reduce the number of read ports to the register file.

FIG. 6 is a detailed diagram of a mixed-modulo adder using shadow segment registers to reduce the number of read ports to the register file. Register file 30 has two read ports. Register file 30 contains general-purpose registers (GPR's) which are used for base 12 and index 14, and in subsequent cycles for segment bases for segments other than the data and stack segments DS, SS, and for a bit offset.

Register file 30 also contains the primary copies of the segment registers CS, DS, SS, ES, FS, GS. When a segment load occurs, comparator 51 signals a write to shadow segment registers 34 when either the data segment DS or stack segment SS is being loaded to register file 30. A secondary copy of the data or stack segment's segment base is then written into one of the two registers in shadow segment registers 34.

For most addresses generated, the segment is the data or stack segment. For these frequent cases, shadow segment registers 34 supply segment base 22 to port A of four-port adder 32 through mux 52. Since segment base 22 is a 32-bit component, no extension is necessary.

The first read port of register file 30, labeled SRC0, supplies index 14 which is zero-extended by extender 56 when 16-bit components are being added. Scaler 58 shifts index 14, performing multiplication by a power of two. For example, shifting index 14 by three bit-positions effectively multiplies index 14 by eight. Thus port C of four-port adder 32 receives (index×scale). Scaler 58 shifts by three bits to the right to get from a bit address to a byte address. Either one or two bits at the bottom are zeroed to get properly aligned halfword (2 bytes) or word (4 bytes) address.

The second read port of register file 30, labeled SRC1, supplies base 12 which is zero-extended by extender 54 when 16-bit components are being added. Port B of four-port adder 32 then receives base 12 after being zero-extended to 32-bits. When the segment is not the data or stack segments, second read port SRC1 is used in a subsequent step to read the proper segment base from the segment registers in register file 30. Since segment bases are 32-bits, extender 54 is disabled in the subsequent step, even though extender 54 may have extended a 16-bit base during the initial step.

When subsequent steps are needed, result 24 from four-port adder 32 is latched into latch 61 and recirculated to port D of four-port adder 32 through mux 60. Thus subsequent steps may add more components to a partial result from an earlier step.

Displacement 28 from an instruction is also extended to 32-bits by extender 62 if necessary before being input to port D of four-port adder 32. Since a new instruction may be decoded after the initial step, displacement 28 is always added in the initial step.

When the instruction being decoded is a bit test instruction, the BIT_TEST to ALU cycle control 46 is activated. The bit offset may be read in a subsequent step from one of the registers in register file 30 using port SRC0 when a register contains the bit offset. The bit offset may also be an immediate value in the instruction word itself. Mux 64 selects immediate bit offset 68 from the instruction or the bit offset from register file 30. When the bit offset is read from a register, scaler 58 shifts the bit offset to the right by 3 to align the bit offset with the byte address being added in four-port adder 32. If word-addresses rather than byte addresses are used, then a 5-bit shift is used. The lowest 3 or 5 bits from the bit offset are routed to special bit-test logic to indicate which of the 32 bits in the word is to be loaded or tested.

Muxes 52, 60, 64, 66 can also supply the value zero to ports A, B, C, or D when necessary. Especially in subsequent steps several of the ports to four-port adder 32 may not be used. ALU cycle control 46 of FIG. 5 generated ZERO_B and ZERO_C to cause muxes 66, 64 to send a zero to port B or port C of four-port adder 32.

Four-port adder 32 is a standard 32bit adder. Ports A, B, C, D all require that full 32-bit input. Extenders 54, 56, 62 zero-extend any 16-bit reduced-width address component by appending 16 zeros to the 16-bit address component. Both signed and unsigned 16-bit components are zero-extended, even when they are negative signed components. Zero-extension has the advantage of simplifying the correction term added so that only a positive correction term is subtracted in the subsequent step.

Carry generator 40 receives the low 16 bits being input to four-port adder 32 on ports B, C, D. When a bit offset is added in a subsequent step, it is received by carry generator 40 over port C and added to the intermediate carry result from the initial step. The final correction term is generated and latched by correction term generator 42 and input to four-port adder 32 through port A and subtracted from the uncorrected sum in latch 61 input to port D. Carry generator 40 does not have to generate the sum of the 16-bit components but merely the carry out to the 17th and 18th bits. Carry generator 40 may temporarily save propagate and generate terms from the initial step which are then used to generate the final carries when the bit offset is added in the subsequent step.

SINGLE-CYCLE ADDRESS GENERATION

For the majority of instructions, the memory address is generated in a single step in one clock cycle. Four-port adder 32 can add up to four address components including the segment base when the segment is the data or stack segment (DS or SS). All 32-bit instructions except bit test which use the data or stack segments can be generated in one step. Sixteen-bit instructions to DS or SS using 16-bit components take just one step as long as no 16-bit carries are detected by carry generator 40, and the instruction is not a bit test instruction. Thus the invention rapidly generates addresses for most operand accesses. Table 1 illustrates how address components are input to the ports of four-port adder 32 for single-step address generation.

TABLE 1

| | Single-Cycle Address Generation | | | |
|---|---|---|---|---|
| Step | Port A | Port B | Port C | Port D |
| 1 | DS or SS Segment Base | Base | Index × Scale | Displacement |

CORRECTION TERM ADDED IN SUBSEQUENT STEP

The correction term must be added when a reduced-modulus carry-out is signaled by carry generator 40 when 16-bit address components are positive or negative numbers. This indicates that an address wrap-around has occurred in the sum of the 16-bit address components. Since a carry-out of the 16th bit has occurred, which has the value of $2^{16}$ or 64K, the carry-out can be removed from the 32-bit sum 24 by subtracting $2^{16}$ for each carry-out generated. Thus the correction term to be added is a multiple of the two's complement of $2^{16}$. Table 2 shows some simple examples for two address components, where 16-bit component B is added to 16-bit component C, and both B and C are positive numbers. All numbers are in hexadecimal format.

TABLE 1

| | Correction Term Examples | | | | |
|---|---|---|---|---|---|
| B | C | $16^b$ Carry | $16^b$ Sum | $32^b$ Sum | Correction Term |
| 0x0000 | 0x0000 | 0 | 0x0000 | 0x00000000 | 0 |
| 0xFFFF | 0x0000 | 0 | 0xFFFF | 0x0000FFFF | 0 |
| 0xFFFF | 0x0001 | 1 | 0x0000 | 0x00010000 | 0xFFFF0000 |
| 0x7FFF | 0x0000 | 0 | 0x7FFF | 0x00007FFF | 0 |
| 0x7FFF | 0x7FFF | 0 | 0xFFFE | 0x0000FFFE | 0 |
| 0x9000 | 0x700B | 1 | 0x000B | 0x0001000B | 0xFFFF0000 |

The correction term, 0xFFFF0000, is the two's complement of 0x00010000, or $2^{16}$. Thus the correction term is equivalent to subtracting $2^{16}$.

When address component B is a negative number, the 16-bit component is zero-extended to 32-bits. Thus the same correction term, the two's complement of $2^{16}$, is added when address components are negative or positive numbers.

The correction term is detected and generated in the initial step 1, and then added in subsequent step 2 to the partial, incorrect sum from step 1 to generate the corrected sum, the generated address. The incorrect sum from step 1 is recirculated to port D while the correction term is input on port A. Ports B and C are zeroed. To perform subtraction of the correction term, correction term generator 42 outputs the two's complement of the correction term. Thus for −64K, correction term generator 42 outputs FFFF0000 hex, while for corrections of −128K and −192K, it outputs FFFE0000, and FFFD0000, respectively. The 2-bit correction term 48 of FIG. 5 is used to select the possible 2's complement output correction terms: FFFF0000, FFFE0000, or FFFD0000..

Table 3 shows two-step address generation when a 16-bit carry is detected in the initial step and the correction term added in the subsequent step. Since the instruction is not a bit test instruction, only three 16-bit address components are added and only 2 carries can be generated. Thus a correction of −64K or −128K is possible.

TABLE 3

| | 2-Cycle Address Generation with Correction Term | | | |
|---|---|---|---|---|
| Step | Port A | Port B | Port C | Port D |
| 1 | DS or SS Segment Base | Base | Index × Scale | Displacement |
| 2 | −64K or −128K | 0 | 0 | Step 1 Sum |

SEGMENT NOT DS OR SS

When the segment accessed is not the data or stack segments (DS or SS), then the shadow segment registers do not contain the needed segment base. A subsequent step is used to read the segment base from register file 30. The subsequent step is necessary since there are only two read ports to register file 30, and these two read ports are used in the initial step for reading the base and index. The segment is read by SRC1 in the subsequent step and input to four-port adder 32 through port B. Table 4 illustrates address generation when the segment misses the shadow segment registers.

TABLE 4

2-Cycle Address Generation When Segment Misses

| Step | Port A | Port B | Port C | Port D |
|---|---|---|---|---|
| 1 | 0 | Basse | Index × Scale | Displacement |
| 2 | 0 | Segment Base | 0 | Step 1 Sum |

When a 16-bit carry-out is detected in the initial step, the correction term is also needed. Since the correction term and the segment base are input to four-port adder 32 on different ports, both may be added in the subsequent step. Table 5 shows two-cycle address generation with both the correction term added in from port A and the segment base added in at port B in the subsequent step.

TABLE 5

2-Cycle Address Generation With Segment Miss and 16-bit Carry

| Step | Port A | Port B | Port C | Port D |
|---|---|---|---|---|
| 1 | 0 | Base | Index × Scale | Displacement |
| 2 | −64K or −128K | Segment Base | 0 | Step 1 Sum |

BIT TEST INSTRUCTION

The bit test instruction requires that an additional address component, the bit offset, be included in the sum when generating the address. While this instruction is rare, it is useful for testing individual bits in a byte which can be loaded into the flags register for use in testing as a jump or loop variable. Since the bit offset is a bit address rather than a byte address, it must be shifted to the right by three bits (8 bits per byte in order to generate a byte address). Thus the bit offset is input through the scaler to Port C. Port C is already used in the initial step for the index, which also used the scaler. Thus the bit offset must be input to the four-port adder in the cycle following the initial cycle, the 2nd cycle.

The bit offset is used to calculate effective address in prior-art systems and thus the correction term depends upon the bit offset when 16-bit components are used. Since the bit offset is not added in until the second step, the correction term is not available until the end of the second step. The correction term is subtracted from the incorrect sum in a third step in a third cycle if any carries are detected. Thus the bit test instruction requires an additional cycle, for a total of two cycles with no correction, or three cycles when correction is necessary. Table 6 illustrates a simple bit test instruction with no carries detected.

TABLE 6

2-Cycle Address Generation For Bit Test

| Step | Port A | Port B | Port C | Port D |
|---|---|---|---|---|
| 1 | 0 | Base | Index × Scale | Displacement |
| 2 | DS or SS Segment Base | 0 | Bit Offset | Step 1 Sum |

When a carry is detected, a third step is required for subtracting the correction term, as shown in Table 7.

TABLE 7

3-Cycle Address Generation For Bit Test with 16-bit Carry

| Step | Port A | Port B | Port C | Port D |
|---|---|---|---|---|
| 1 | 0 | Base | Index × Scale | Displacement |
| 2 | DS or SS Segment Base | 0 | Bit Offset | Step 1 Sum |
| 3 | −64K or −128K or −192K | 0 | 0 | Step 2 Sum |

A correction term of 192K is possible since three carries are possible when the bit offset is added to the other 3 address components. When the segment is not the data or stack segment, it may be added in during the second cycle since Port B is used, as shown in Table 8.

TABLE 8

2-Cycle Address Generation For Bit Test With Segment Miss

| Step | Port A | Port B | Port C | Port D |
|---|---|---|---|---|
| 1 | 0 | Base | Index × Scale | Displacement |
| 2 | 0 | Segment Base | Bit Offset | Step 1 Sum |

Finally when the 16-bit carry is detected and the segment misses, the segment base from the register file is added in during the third cycle, as shown for Table 9.

TABLE 9

3-Cycle Address Generation For Bit Test with 16-bit Carry and Segment Miss

| Step | Port A | Port B | Port C | Port D |
|---|---|---|---|---|
| 1 | 0 | Base | Index × Scale | Displacement |
| 2 | 0 | 0 | Bit Offset | Step 1 Sum |
| 3 | −64K or −128K or −192K | Segment Base | 0 | Step 2 Sum |

Several variations are possible for complex instructions such as the bit test instruction and will be apparent to those of skill in the art.

X86 ADDRESSING AND ADDRESS COMPONENTS

The x86 architecture is for a complex instruction set computer (CISC) and hence address generation can be quite complex. The program or effective address is defined as the sum of one or more address components, which are reduced-width in some modes. The linear address is the effective address added to the 32-bit full-width segment base address. The x86 architecture defines the following address components:

base
index
displacement
segment base.

The segment base is always a positive number, of full width (32-bits). The other components can be reduced-width, or 16-bits. The base is always a positive, unsigned number. However, the displacement is always a signed (negative or positive) number, and the index can be either signed or unsigned. In 32-bit addressing a scale or multiplication factor of 2, 3 or 8 may be applied to the index. This scale factor is not available with 16-bit addressing.

Figure 7:
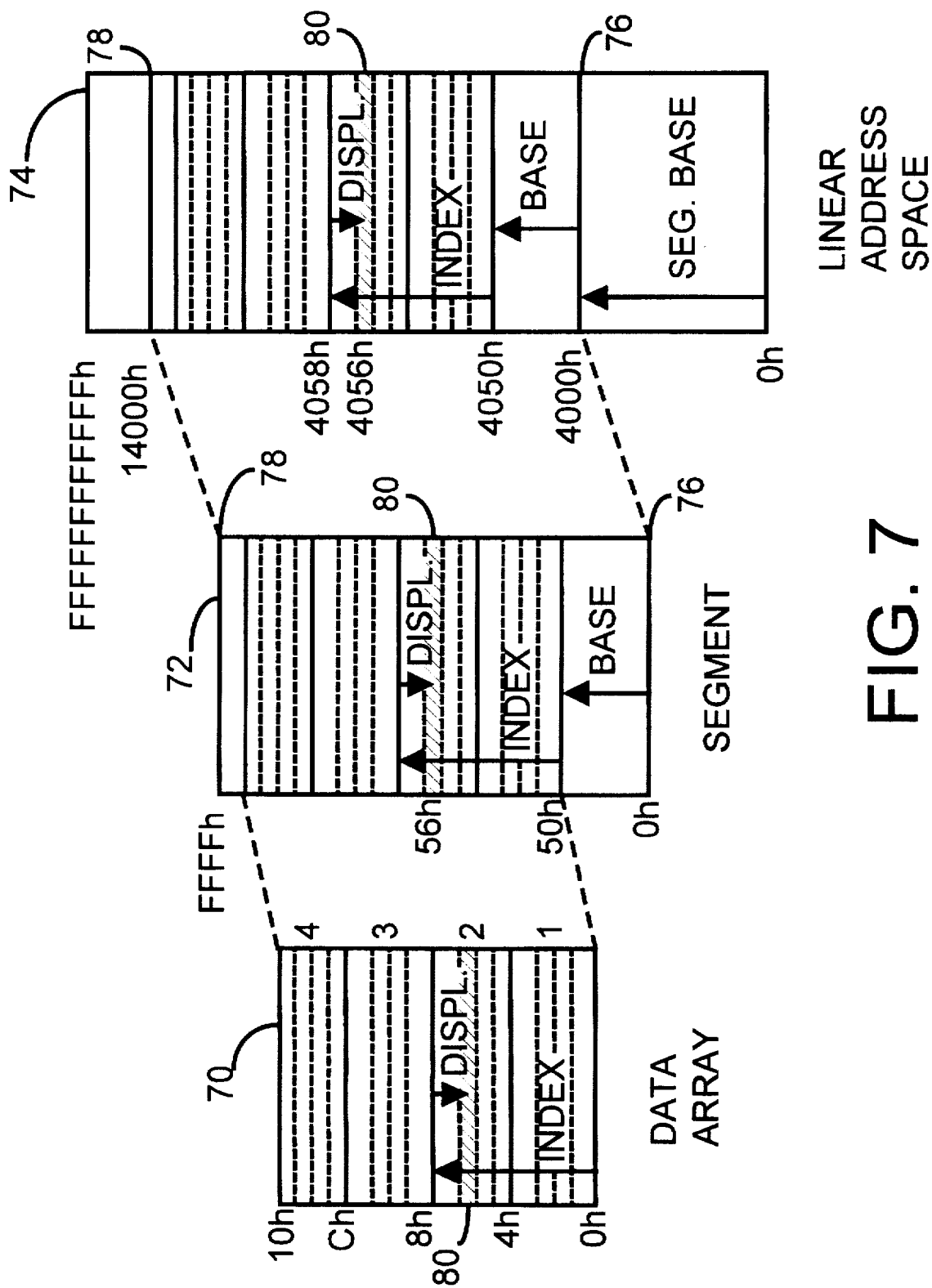
FIG. 7 shows a data array structure stored in memory in the virtual address space and in the linear address space.

FIG. 7 shows a structured data array 70 stored in memory. Data array 70 contains 4 items, with each item occupying 4 address locations. A desired byte 80 within the data array 70 may be accessed by specifying an index and displacement. The location of the data array 70 must also be specified by the base address component. The index specifies the data item, while the displacement specifies the address relative to the upper address in the item, in this particular example. Thus the third address of item 2 may be specified with an index of 8 (2 items×4 addresses/item), and a displacement of −2. Many different ways of structuring data arrays using base, index, and displacements will be obvious to one skilled in the art and still fall within the spirit of the invention.

FIG. 7 also shows the data array 70 in the virtual address space or segment 72 and in the linear address space 74. Segment 72 is 64K bytes in size, extending from the segment base address 76 to the segment upper bound 78. The third byte of the second item in data array 70, the desired byte 80, is specified within the segment 72 as the sum of the base, index, and displacement address components. Within the effective address space or segment 72, the segment base 76 has address 0.

Segment 72 containing data array 70 is also shown in the linear address space 74. The entire segment 72 contains 64K bytes. Segment base address 76 has the value 4000 hex and corresponds to virtual address 0. Thus the segment base address component has the value 4000 hex. The upper bound 78 of the segment has a linear address of 4000+64K, or 14000 hex, since 64K is 10000 hex. Thus the linear address of the desired byte 80 in data array 70 in segment 72 is 4056, and is calculated as:

base+index+displacement+segment base address
50+8+−2+4000.

Note that the segment base address 76 and the base address component are two different address components. In this example, segment base address 76 has the value 4000 and is a 32-bit value, while the base has the value 50 and is a 16-bit address component.

IMPLEMENTATION OF SIMPLE X86 ADDRESSING MODES

Several x86 addressing modes exist from the combinations of base, index, and displacement address components. All of these components are not always present for any given address calculation. However, the 32-bit segment base address is always present. When one or more of the components (base, index, displacement) is not present, the corresponding port of the four-port adder is driven with 32 zero bits. Muxes described in FIG. 6 are used to zero these unused ports.

The index may or may not be multiplied by a constant (such as a scaling factor) before being input to the adder by a simple bit-shift. The displacement from the instruction word may be an 8-bit component which is either zero-extended or sign-extended to 16 bits before being zero-extended to 32 bits.

The simplest case is when only a single one of the three reduced-width address components, base, index, displacement, are present. The one reduced-width address component is zero-extended and input to a port of the four-port adder, while a zero is applied to other inputs, and the full-width 32-bit segment base address is input to port A.

An addressing-mode byte may be appended or prefixed to an instruction to indicate the addressing mode used. For example, a prefix known as the ModR/M byte determines which of the base, index, and displacement are present and to be used in calculating the effective address. Register or memory operands may also be selected.

ALTERNATE EMBODIMENTS

Several other embodiments are contemplated by the inventors. For example the invention should not be restricted to the four-port adder described, but could be implemented in larger multi-port adders or in simple 2- or 3-port adders. Polarities of sign extensions or inputs could be reversed. Active low signals could be employed rather than the active high signals herein described. Computation could require several clock cycles or only a fraction of a clock cycle. Pipeline staging registers may be inserted such as after the register file is read but before the address generate adder to implement pipelining. Many implementations of the logic required for the adder and other functions are possible. The exact number of bits in the adder may vary because of architectural modifications. The exact coupling of the recirculated sum, the correction term, and the address components to the ports A, B, C, D can be varied by persons with skill in the art within the teachings and spirit of this invention.

Although the invention has been described in reference to address generation using reduced-width address components, the invention may also be employed for other arithmetic operations besides address generation. Although modulus addition has been described, other modulus operations such as division, multiplication, or subtraction could also use the teachings of this invention wherein a subset of inputs require that a modulus-arithmetic operation be performed on them.

While the invention has been described with reference to 16-bit reduced-modulus address components in the context of the 32-bitx 86 architecture, persons skilled in the art can apply the teachings of this invention to other moduli and architectures such as 64-bit RISC or CISC architectures. When more that 2 address components are added together, then more than one carry out may be signaled, and the invention may be extended for these circumstances. A separate shadow copy of the code segment register may also be provided so that instruction addresses may be generated using the invention. The inventors have chosen to create shadow copies of the SS and DS segments, but other segments may also be selected.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A mixed-modulo adder for adding together reduced-width binary numbers in a reduced modulus while further adding in a full-width binary number in a full modulus, the mixed-modulo adder comprising:

zero-extend means, receiving the reduced-width binary numbers, for extending the reduced-width binary numbers to a full width, the zero-extend means outputting extended binary numbers having the full width;

a multi-port adder, receiving as inputs the extended binary numbers from the zero-extend means and receiving the full-width binary number, for calculating a full-modulus sum of the inputs received;

reduced-modulus carry generator means, receiving the reduced-width binary numbers, for generating a reduced-modulus carry-out when a sum of the reduced-width binary numbers equals or exceeds the reduced modulus; and correction term input means, coupled to an input of the multi-port adder, for inputting in a subsequent step a correction term to the multi-port adder when the reduced-modulus carry-out is generated, the correction term being an adjustment to the full-modulus sum to compensate for the effect of addition of the reduced-width binary numbers in the full-modulus, whereby full-modulus addition is performed on the reduced-width binary numbers by zero-extension and addition of the correction term in the subsequent step when the reduced-modulus carry-out is generated by the reduced-modulus carry generator means.

2. The mixed-modulo adder of claim 1 wherein the carry-out generated by the reduced-modulus carry generator means indicates a number of carries out of the reduced modulus, and further comprising:

correction term generation means, coupled to the correction term input means and receiving the carry-out, for generating the correction term as the reduced modulus multiplied by the number of carries out of the reduced modulus, whereby the correction term is adjusted for multiple carries out of the reduced modulus detected by the reduced-modulus carry generator means.

3. The mixed-modulo adder of claim 2 further comprising:

complement means, receiving the correction term and coupled to the correction term input means, for generating a two's complement of the correction term for input to the multi-port adder.

4. The mixed-modulo adder of claim 2 wherein the reduced-width binary numbers are address components and wherein the full-width binary number is a segment base address, the full-modulus sum being a linear address when the carry-out is not generated, but a sum from the multi-port adder in the subsequent step being the linear address when the carry-out is generated.

5. The mixed-modulo adder of claim 4 wherein the full width is 32 bits and the reduced width is 16 bits and wherein the reduced modulus is 64K.

6. The mixed-modulo adder of claim 4 further comprising:

a register file, coupled to the zero-extend means, for storing the reduced-width binary numbers and for storing a plurality of segment bases including the full-width binary number;

a shadow segment register, coupled to the multi-port adder, for storing a copy of a segment base for a frequently-accessed segment;

segment base input means, coupled to the shadow segment register, for inputting as the full-width binary number to the multi-port adder the segment base in the shadow segment register when the linear address is an address in the frequently-accessed segment, but inputting as the full-width binary number to the multi-port adder a segment base in the register file when the linear address is not an address in the frequently-accessed segment.

7. The mixed-modulo adder of claim 6 further comprising:

additional step means, coupled to the segment base input means, for inputting to the multi-port adder during an additional step the segment base in the register file when the linear address is not an address in the frequently-accessed segment, whereby the additional step is required when the linear address is not an address in the frequently-accessed segment.

8. The mixed-modulo adder of claim 6 wherein the multi-port adder comprises a four-port adder having four inputs and wherein up to two inputs are reduced-width binary numbers read from the register file and one input is the segment base from the shadow segment register when the linear address is the address in the frequently-accessed segment.

9. The mixed-modulo adder of claim 8 further comprising:

displacement means, coupled to an input of the multi-port adder, for decoding a displacement from an instruction, the displacement being a reduced-width address component.

10. The mixed-modulo adder of claim 8 wherein the frequently-accessed segment is a data segment or a stack segment in an x86 architecture.

11. A computer-implemented method for generating a linear address in a full-width adder in a central processing unit (CPU), the linear address being a sum of a first address component and a second address component and a third address component, the first and the second address component having a reduced width less than a full width while the third address component having the full width, the first, second, and third address components each being represented by a plurality of signals on a bus, the method comprising:

zero-extending the first address component from the reduced width to the full width by copying a zero signal to bit positions in the full width but not in the reduced width, producing an extended first address component;

zero-extending the second address component from the reduced width to the full width by copying the zero signal to bit positions in the full width but not in the reduced width, producing an extended second address component;

generating in the full-width adder on the CPU an initial full-width sum of the extended first address component, the extended second address component, and the third address component;

outputting the initial full-width sum generated by the full-width adder onto a full-width bus in the CPU;

determining in a reduced-modulus carry generator on the CPU when a partial sum of the first address component and the second address component is equal to or exceeds a reduced modulus;

generating a reduced-modulus carry-out signal when the partial sum is equal to or exceeds a reduced modulus;

when the carry-out is not signaled, outputting the initial full-width sum as the linear address;

when the carry-out is signaled, recirculating the initial full-width sum to an input of the full-width adder and adding to the initial full-width sum a correction term to generate the linear address in the full-width adder in a subsequent step, whereby reduced-width address components are added to full-width address components in the full-width adder and the correction term is added when the carry-out is signaled by the reduced-modulus carry generator.

12. The computer-implemented method of claim 11 further comprising:

reading the first address component from a register file containing a plurality of address components using a first read port to the register file;

reading the second address component from the register file containing a plurality of address components using a second read port to the register file;

determining when the linear address is in a frequently-used segment and signaling a segment hit;

reading the third address component from a shadow segment register when the segment hit is signaled;

reading the third address component from the register file in an additional step after the first address component is read when the segment hit is not signaled recirculating the initial full-width sum to the input to the full-width adder and performing the additional step to add the third address component to the initial full-width sum when the segment hit is not signaled, whereby the shadow segment register supplies the third address component when the segment hit is signaled but the additional step is required to read the third address component from the register file when the segment hit is not signaled.

13. The computer-implemented method of claim 12 wherein the third address component is a segment base address, and wherein the first and second address components are each selected from the group consisting of a base and an index.

14. The computer-implemented method of claim 12 further comprising:

determining from the reduced-modulus carry generator a number of carries out of the reduced modulus;

increasing a magnitude of the correction term by the reduced modulus for each carry in excess of one carry out of the reduced modulus.

15. The computer-implemented method of claim 14 wherein the correction term is a multiple of a two's complement of the reduced modulus.

16. The computer-implemented method of claim 12 further comprising:

detecting a segment load operation;

loading a segment base into the register file;

loading a copy of the segment base into the shadow segment register when the segment base loaded into the register file is for the frequently-used segment;

whereby the copy of the segment base is loaded into the shadow segment register when the segment load operation occurs.

17. The computer-implemented method of claim 12 further comprising:

decoding an instruction for a displacement and generating a fourth address component from the displacement;

zero-extending a fourth address component from the reduced width to the full width by copying the zero signal to bit positions in the full width but not in the reduced width, producing an extended fourth address component;

wherein the initial full-width sum and the partial sum include the fourth address component;

whereby four address components are simultaneously added together in the full-width adder.

18. The computer-implemented method of claim 17 further comprising:

determining when the instruction is a bit test instruction and activating a bit test signal;

performing an additional cycle when the bit test signal is activated, wherein a bit offset is added to the initial full-width sum during the additional cycle.

19. An address generate unit comprising:

a four-port adder for adding four inputs together in a full modulus and outputting a sum;

a register file for storing address components and segment bases, the register file having two ports for supplying two address components or segment bases in a cycle;

a shadow segment register, coupled an input of the four-port adder, for storing a segment base which is also stored in the register file;

a zero-extender, for extending address components which are reduced width to a full width of the four-port adder and inputting extended address components to the four-port adder;

a reduced-modulus carry generator, receiving the address components which are reduced width, for generating carries beyond a reduced modulus for a partial sum of the address components received;

a correction term generator, receiving the carries generated, for outputting a correction term to the four-port adder when at least one carry is generated; and a sum feedback path, for feeding the sum from the four-port adder to an input of the four port-adder for use in a subsequent cycle, the four-port adder adding the correction term to the sum to generate a corrected sum, wherein the corrected sum being the address generated when a carry is generated but the sum being the address generated when the carry is not generated.

* * * * *